US005748135A

United States Patent [19]

Kriegsman et al.

[11] Patent Number: 5,748,135

[45] **Date of Patent: *May 5, 1998**

[54] WIRELESS REMOTE CONTROL TRANSMITTER FOR USE WITH CONSUMER ENTERTAINMENT ELECTRONICS APPLIANCE

[76] Inventors: Irving M. Kriegsman, 250 Baldwin Ave., Framingham, Mass. 01701; Edward M. Kriegsman, 103 Richard Rd., Holliston, Mass. 01746; Daniel S. Kriegsman, 67 Arlington St., Apt. 1, Newton, Mass. 02158

[*] Notice: The term of this patent shall not extend beyond the expiration date of Pat. No. 5,534,865.

[21] Appl. No.: 676,438

[22] Filed: Jul. 8, 1996

Related U.S. Application Data

[63] Continuation-in-part of Ser. No. 984,184, Nov. 20, 1992, Pat. No. 5,534,865.

[51] Int. Cl.$^6$ .................... H04B 10/00

[52] U.S. Cl. .................... 341/176; 341/174; 359/142

[58] Field of Search .................... 341/176, 174, 341/22, 23; 359/142, 146, 148; 348/734

[56] References Cited

U.S. PATENT DOCUMENTS 5,534,865 7/1996 Kriegsman et al. .................... 341/176

FOREIGN PATENT DOCUMENTS 2714874 10/1978 Germany .................... 455/352
369222 3/1991 Japan .................... 341/176

OTHER PUBLICATIONS

Sony Betamax Remote Commander model No. RMT-124 accessory, Sony stereo VCR model No. SL-HF300 owner's manual, 1984.

*Primary Examiner*—Jeffrey Hofsass
*Assistant Examiner*—Andrew Hill
*Attorney, Agent, or Firm*—Kriegsman & Kriegsman

[57] ABSTRACT

A wireless remote control transmitter for remotely controlling the operation of home entertainment devices. In one embodiment, the transmitter comprises a generally rectangular housing having a top end, a bottom end, a front, a back, a right side and a left side. An L-shaped printed circuit board is disposed within the housing, the board having a front portion and a right side portion. The printed circuit board includes a first LED adapted to transmit a beam of infrared light through a window in the top end of the housing, a second LED adapted to transmit a beam of infrared light through a window in the right side of the housing, suitable electronics and a printed circuit coupling the LED's to the electronics. A first keyboard, whose keys are accessible from the front of the housing, is positioned over the front of the printed circuit board. A second keyboard, whose keys are accessible from the right side of the housing, is positioned over the right portion of the printed circuit board. A second keyboard, whose keys are accessible from the right side of the housing, is positioned over the right portion of the printed circuit board. Depression of the keys of the first keyboard against the portion on the printed circuit on the front of the printed circuit board causes the first LED to emit appropriately coded signals through the top end of the housing. Depression of the keys of the second keyboard against the portion of the printed circuit on the right side of the printed circuit board causes the second LED to emit appropriately coded signals through the right side of the housing. The keys of the second keyboard preferably correspond to functions of the remotely controlled device that are most often controlled by users.

10 Claims, 8 Drawing Sheets

WIRELESS REMOTE CONTROL TRANSMITTER FOR USE WITH CONSUMER ENTERTAINMENT ELECTRONICS APPLIANCE

CROSS-REFERENCE TO RELATED APPLICATIONS

The present application is a continuation-in-part of presently pending U.S. patent application Ser. No. 07/984,184, filed Nov. 20, 1992, now U.S. Pat. No. 5,534,865.

BACKGROUND OF THE INVENTION

The present invention relates to wireless remote control transmitters of the type typically used to control the operation of one or more consumer entertainment electronics appliances, such as television sets, video cassette recorders, stereo systems and the like.

Wireless remote control transmitters of the type typically used to control the operation of consumer entertainment electronics appliances are well known in the art. Typically, such transmitters are hand-held devices comprising an elongated generally rectangularly shaped housing having a front, a back, a top end, a bottom end and a pair of sides, the housing containing a printed circuit board having electronics including an infrared LED, a keyboard having a plurality of function-selection keys, the keys being actuable from the front of the housing and one or more batteries for providing power for the transmitter. In use, actuation of a selected key on the keyboard causes a correspondingly coded optical signal to be transmitted form the infrared LED through an opening in the top end of the housing to a receiver in the targeted electronic appliance. Typically, the front of the housing is considerably wider than the sides to accommodate the arrangement of a plurality of keys.

Additional information relating generally to wireless remote control transmitters may be found in U.S. Pat. No. 4,377,006 to Collins et al., U.S. Pat. No. 4,425,647 to Collins et al., U.S. Pat. No. 4,626,8476 to Zato, U.S. Pat. No. 4,626,848 to Ehlers, U.S. Pat. No. 5,073,979 and U.S. Pat. No. 5,005,084 to Skinner.

Wireless remote control transmitters as described above are typically held in a user's hand by resting the back of the housing against the user's index finger while inward pressure is applied to sides of the housing using the user's thenar eminence and thumb on one side and the remaining fingers on the opposite side. With the unit thus in the user's hand, operation thereof is typically effected in one of two ways: (1) by having the user move his thumb from the side of the housing to the front of the housing and then depressing one of the keys on the front using the bottom surface or the inner side surface of the user's thumb or (2) by having the user hold the unit in one hand in the manner described above while manipulating the keys on the front of the housing using a finger on his other hand.

As can readily be appreciated, the manipulation and operation of a transmitter in the ways described above can become rather cumbersome and difficult after prolonged periods of time, particularly for those people who use the remote control transmitter to frequently change the channel and/or to adjust the volume of a television set. Moreover, particularly for those people who use a remote control unit while in a reclining or similar position, thee problems are further exacerbated by the fact that the top end of the housing must be pointed in the direction of the device being controlled during actuation of one or the control keys to ensure that the light emitted form the transmitter will be detected by a corresponding receiver in the device being controlled. Finally, in addition to the aforementioned problems, in those instances in which the transmitter is held in one hand and is controlled by actuating the keys on the front of the unit using one's thumb as described above, attempts to actuate a desired key with the thumb are often unsuccessful due to the lack of sensitivity and the limited range of motion inherently associated with the human thumb.

An alternative way that is sometimes employed to hold and operate the above—described remote control transmitter with one hand is to hold the housing with the back facing down using the thumb on one side and the outer three fingers on the opposite side. The keys on the front may then be actuated with the user's index finger. One difficulty with this technique is that the unit is not well supported in the user's hand; consequently, the unit may be dropped or may pivot downwardly when downward pressure is applied to actuate the keys. This technique also suffers from the same problems of fatigue and awkwardness associated with the other techniques described above.

SUMMARY OF THE INVENTION

It is an object of the present invention to provide a new and novel wireless remote control transmitter for controlling the operation of a consumer entertainment electronics appliance.

It is another object of the present invention to provide a wireless remote control transmitter which is easy and inexpensive to assemble and which can be mass produced.

It is still another object of the present invention to provide an wireless remote control transmitter which is easy to operate and which overcomes at least some of the disadvantages discussed above in connection with existing wireless remote control transmitters.

It is still yet another object of the present invention to provide a wireless remote control transmitter which is adapted for use with one or more consumer entertainment electronic appliances, such as television sets, video cassette recorders, stereo systems and the like.

According to one feature of the invention, a wireless remote control transmitter for operation of a consumer entertainment electronics appliance is provided in which at least some of the encoded electromagnetic radiation signals exit the transmitter through the side of the housing or the back of the housing or the top of the housing or any combination thereof.

According to another feature of the invention, a wireless remote control transmitter for operation of a consumer entertainment electronics appliance is provided which includes a manually operable control on the side of the housing.

Additional objects, features and advantages of the present invention will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing form the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 2:
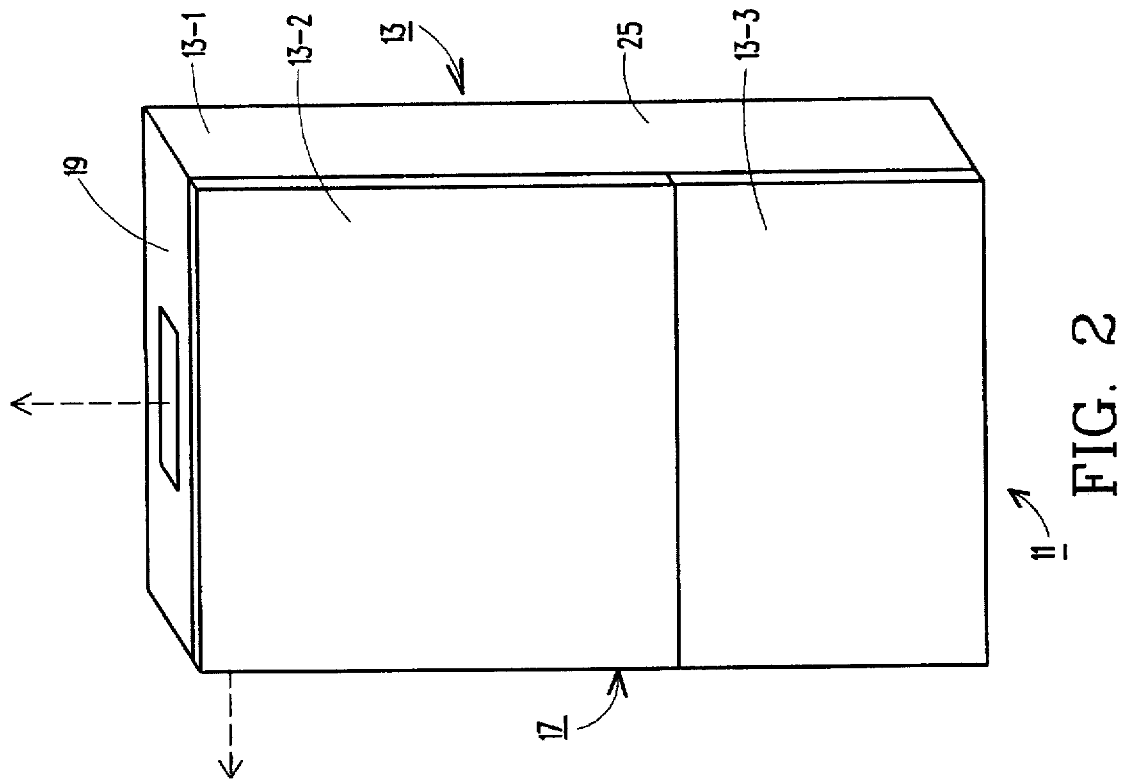
FIG. 2 is a perspective view taken from the rear of the wireless remote control transmitter shown in FIG. 1.
Figure 1:
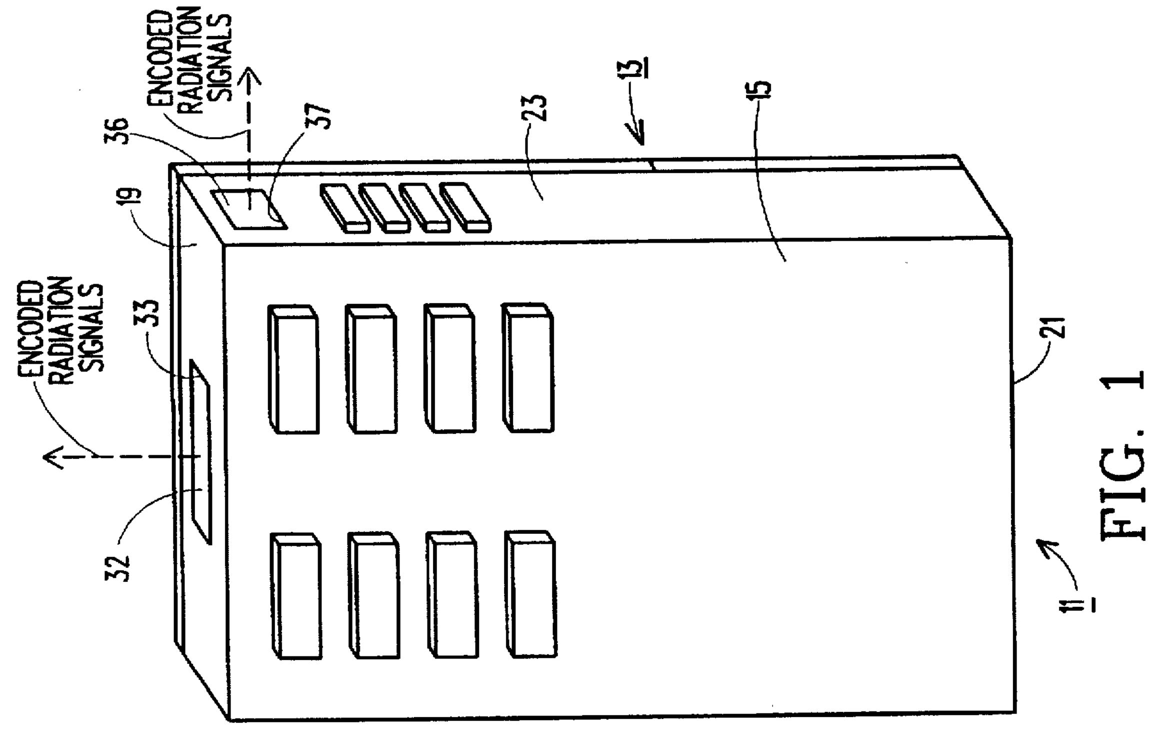
FIG. 1 is a perspective view taken from the front of a first embodiment of a wireless remote control transmitter constructed according to the teachings of the present invention.
Figure 5:
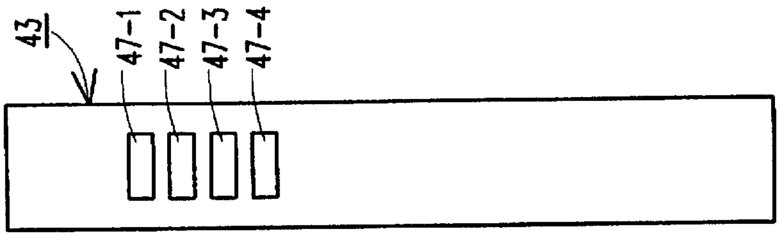
FIG. 5 is a plan view of the side keyboard in the wireless remote control transmitter shown in FIG. 3.
Figure 4:
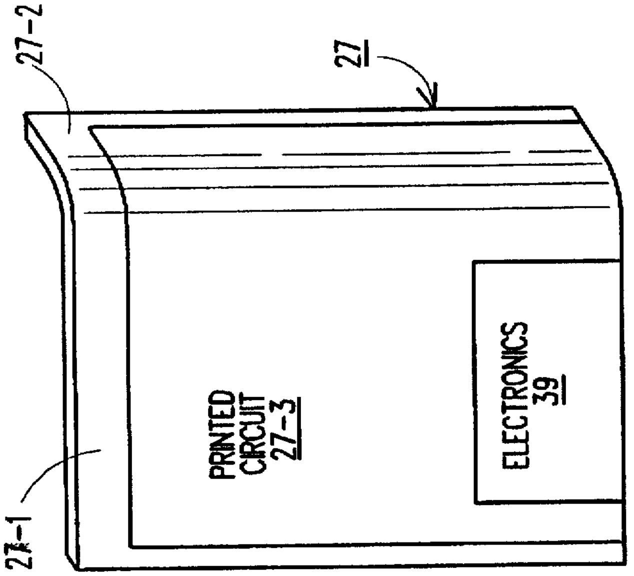
FIG. 4 is a perspective view of the printed circuit board shown in FIG. 3.
Figure 3:
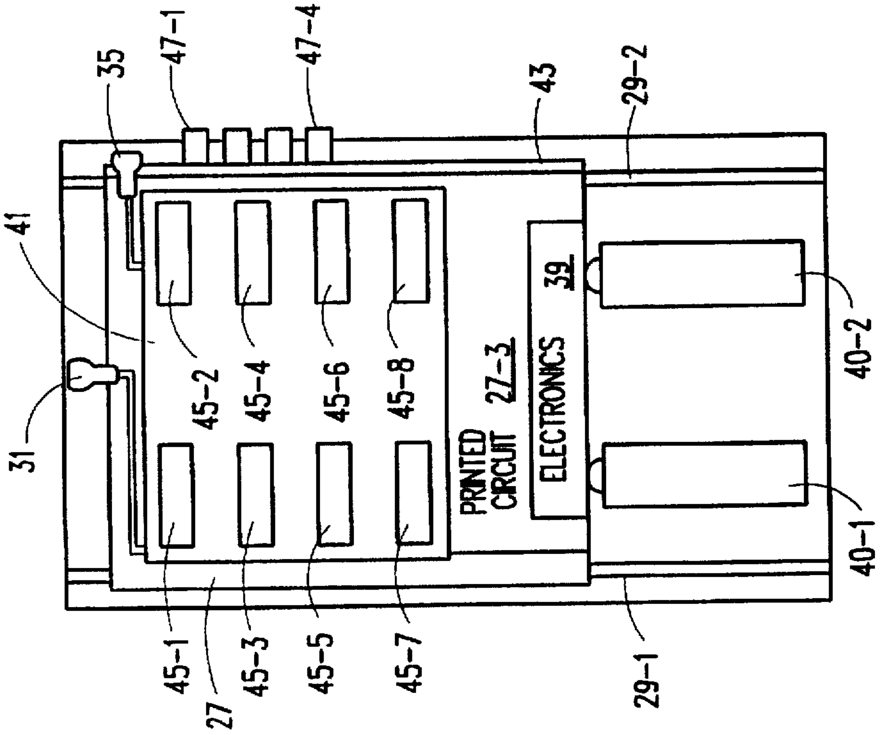
FIG. 3 is a front view of the wireless remote control transmitter shown in FIG. 1 with the front piece of the housing removed.

Referring now to FIGS. 1 through 5, there is shown an embodiment of a wireless remote control transmitter constructed according to the teachings of the present invention for use in controlling the operation of a consumer entertainment electronics appliance, the wireless remote control transmitter being represented generally by reference numeral 11. Those portions of transmitter 11 which are well-known are not described herein or shown.

Transmitter 11 comprises a generally rectangular housing 13. Housing 1'3 includes a front piece 13-1, an upper back piece 13-2 and a lower back piece 13-3 which are fabricated from conventional materials such as plastic and which, when assembled, define a cavity bounded by a front 15, a back 17, a top end 197 a bottom end 21, a right side 23, and a left side 25. Front piece 13-1 and upper back piece 13-2 are press fit together. Lower back piece 13-3 is slidably mounted and snap locked onto upper back piece 13-2. Instead of being press fit, pieces 13-1 and 13-2 may be held together by screws or an adhesive.

Transmitter 11 also comprise a flexible printed circuit board 27 which is disposed within housing 13. Board 27, which is bent into an L-shaped structure having a front portion 27-1 and a right side portion 27-2, is supported within housing 13 by a pair of brackets 29-1 and 29-2 integrally formed on the inner surface of back 17. Board 27 includes a printed circuit 27-3 which extends over most of front portion 27-1 and right side portion 27-2. A first infrared LED 31 is mounted on board 27, coupled to printed circuit 27-3, and positioned to transmit coded optical signal through a window 32 in an opening 33 formed in top end 19. A second infrared LED 35 is mounted on board 27, coupled to circuit 27-3 and positioned to transmit coded optical signal through a window 36 in an opening 37 formed in first side wall 23. Electronics 39 (the particulars of which are well-known to those of ordinary skill in the art are also mounted on board 27 and coupled to circuit 27-3. Electronics 39, when actuated by pressing one or more of the keys to be described below into contact with a corresponding portio of printed circuit 27-3, cause LED 31 or LED 33 to emit an encoded optical signal corresponding to a desired function of the remote device being controlled.

Transmitter 11 also includes a pair of batteries 40-1 and 40-2 which are removably mounted inside housing 13 and electrically connected to board 27. Batteries 40 are accessible by removing lower back piece 13-3.

Transmitter 11 further comprises a pair of conventional keyboards 41 and 43 for unputting commands to electronics 39. Keyboard 41 is positioned in front of front portion 27-1 of board 27 and has a plurality of manually depressible function keys 45-1 through 45-8 which extend outwardly through openings in front piece 13-1, the number of keys shown being for illustrative purposes only. Keyboard 43 is positioned in front of right portion 27-2 of board 27 and has as set of four manually depressible function keys 47-1 and 47-4 which extend outwardly through right side 23 of housing 13, the number of keys shown being for illustrative purposes only. When any one of keys 45-1 through 45-8 is depressed, electronics 39 causes LED 31 to transmit a corresponding coded signal through window 32 in top 19. When any one of keys 47-1 and 47-4 is depressed, electronics 39 causes LED 35 to transmit a corresponding coded signal through window 36 in right side 23.

For reasons to become apparent below, keys 47-1 and 47-4 are preferably reserved for controlling those functions of the consumer entertainment electronics appliance that are most frequently controlled by users. For example, if transmitter 11 is intended for use with a television set, keys 47-1 to 47-4 could correspond to the "channel up", "channel down", "volume up" and "volume down" keys. Similarly, if transmitter 11 is intended to use with a stereo system, keys 47-1 to 47-4 could correspond to the "volume down", "power on" and "power off" keys. Other possible uses to which function keys 47-1 through 47-4 could be put will be readily apparent to those of ordinary skill in the art.

Transmitter 11 may be held in either the left hand or the right hand of a user.

Figure 6:
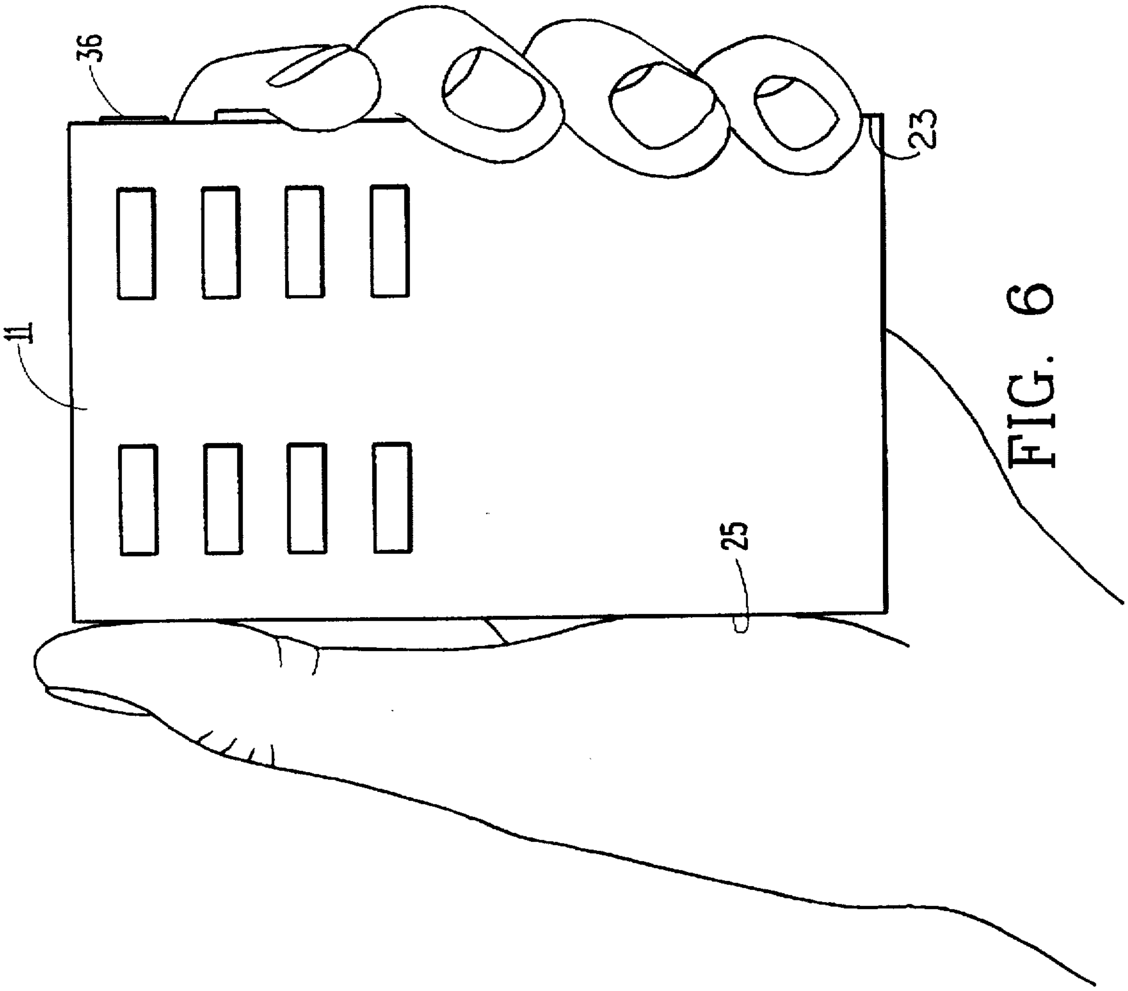
FIG. 6 is a front view showing how the wireless remote control transmitter is held for use in the left hand of a user.

In use, keys 45-1 through 45-8 may be operated using any of the techniques described above in the Background section of this specification. To operate keys 47-1 to 47-4 (e.g., to scan through a plurality of successive television channels or to adjust volume) using the left hand, transmitter 11 is preferably held between the user's thumb and/or thenar eminence on left side wall 25 and the user's middle, ring, and pinky fingers on right side wall 23, with light transmissive window 36 pointed in the direction of the electronic entertainment appliance to be controlled and back 17 facing the user's palm as shown in FIG. 6. Thus positioned, the user's index finger is free to depress keys 47-1 through 47-4. It is believed that by holding transmitter 11 like a gun and using a trigger-like motion to depress keys 47-1 through 47-4, the previously discussed problems of fatigue and awkwardness will be substantially reduced.

It should be understood that transmitter 11 merely illustrates an example of the type and number of keys 47 which may be operated from right side wall 23 of housing 13 in accordance with the teachings of the present invention. It should also be understood that flexible printed circuit board 27 of transmitter 11 could be replaced with a pair of printed circuit boards or the like disposed at a right angle and electrically connected with conventional electrical connectors. It should further be understood that LED's 31 and 35 could be replaced with a single LED and means, comprising a movable mirror of the like, for directing the beam of light emitted from the LED through either window 36 or window 32, depending upon which of keys 45 or 47 is depressed. Also, printed circuit 27-3 could be of a construction such that both LED's are energized when any key on either board 41 and 42 depressed. Also, electromagnetic radiation emitting devices other than infrared diodes such as for example, a microwave device, could be employed.

It should further be understood that board 27 and keyboard 43 could be arranged within housing 13 so that keys 47-1 to 47-4 extend outwardly through left side 25, as opposed to right side wall 23, to permit their actuation with the user's thumb.

Figure 8:
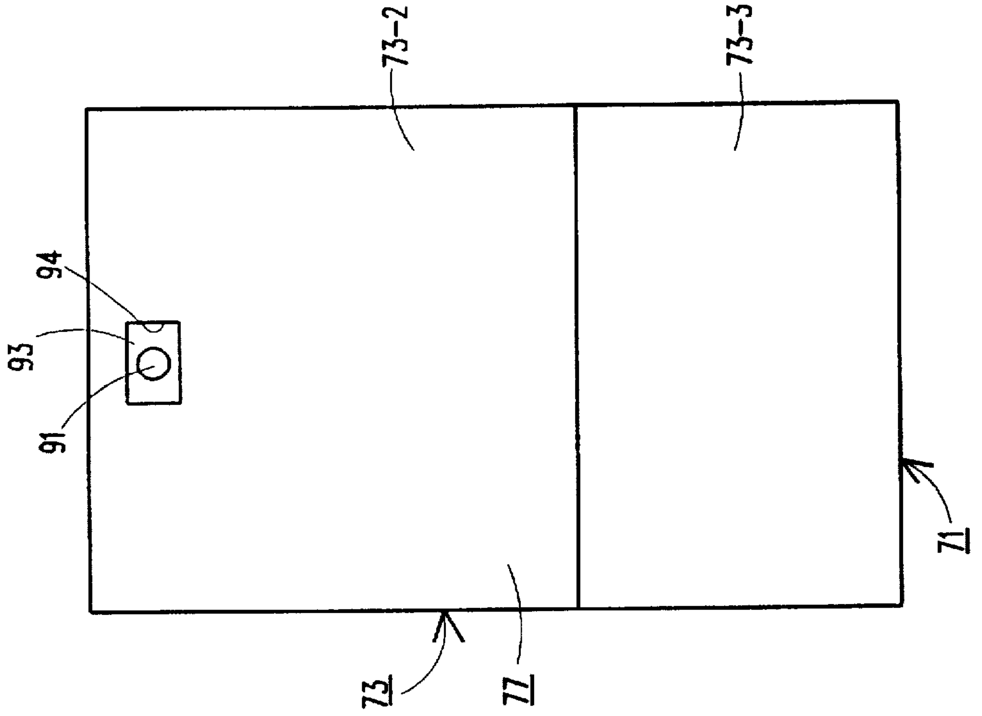
FIG. 8 is a plan view taken from the rear of the remote control transmitter shown in FIG. 7.
Figure 7:
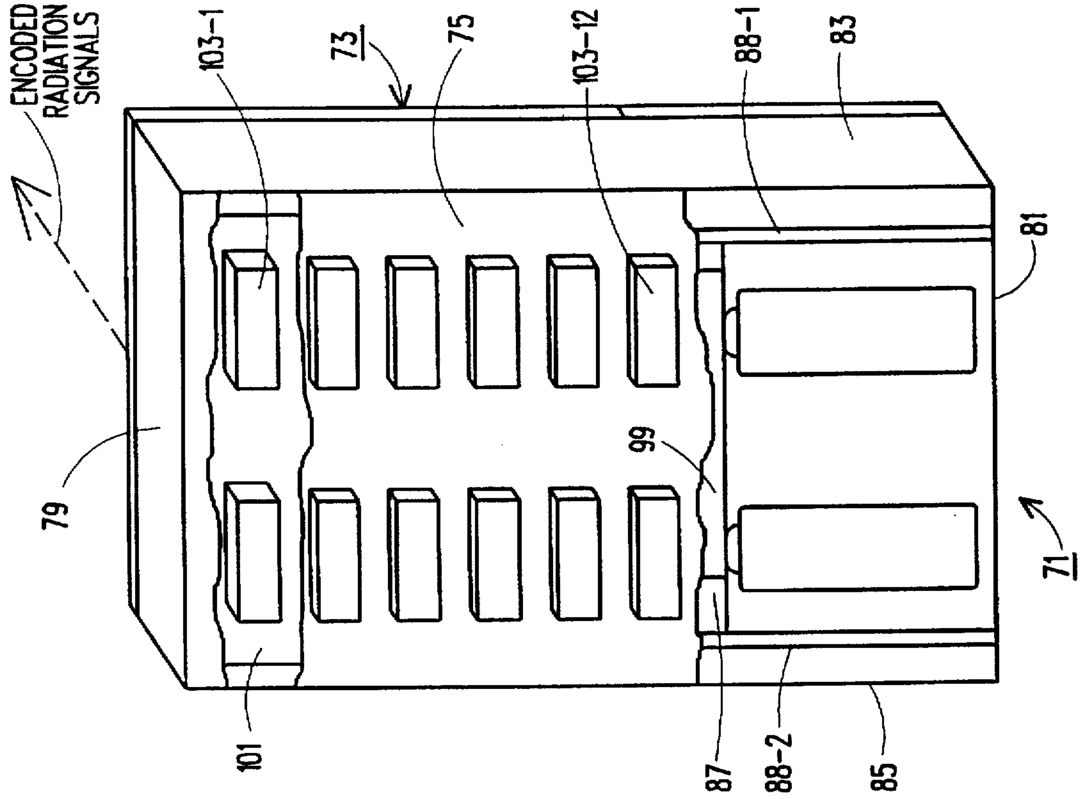
FIG. 7 is a perspective view taken from the front of another embodiment of a wireless remote control transmitter constructed according to the teachings of the present invention.

Referring now to FIGS. 7 and 8, there is shown another embodiment of a wireless remote control transmitter constructed according to the teachings of the present invention, the wireless remote control transmitter being represented generally by reference numeral 71. Those portions of transmitter 71 which are well-known are not described herein or shown.

Transmitter 71 comprises a generally rectangular housing 73. Housing 73 includes a front piece 73-1 and upper and lower back pieces 73-2 and 73-3 respectively which are fabricated from conventional materials such as a rigid plastic and which, when assembled, define a cavity bounded by a front 75, a back 77, a top end 79, a bottom end 81, a right side 83, and a left side 85.

Transmitter 71 also comprises a printed circuit board 87 disposed within housing 73. Board 87, is supported within housing 73 by a pair of brackets 88-1 and 88-2 integrally formed on the inner surface of back 77.

An infrared LED 91 is mounted on board 87 and is oriented to transmit, when actuated, coded optical signals through a light transmissive window 93 mounted in an opening 94 in back 77. Board 87 also includes electronics 99 (the particulars of which are well-known to one of ordinary skill in the art which, when actuated using one or several manually operable keys to be described below, may be used to cause LED 91 to emit an encoded optical signal corresponding to a desired function of the consumer entertainment electronics appliance being controlled.

Transmitter 71 also includes a pair of conventional batteries 100-1 and 100-2 which are disposed within housing 73 and which are physically and electrically connected to board 87 in a conventional fashion to provide electrical current thereto.

Transmitter 71 further includes a conventional keyboard 101 which is disposed within housing 73. Keyboard 101 is positioned on top of board 87 and has a plurality of manually depressible function keys 103-1 through 103-12 which extend outwardly through front 75 of housing 73. When any one of keys 103-1 through 103-15 is depressed, electronics 99 causes LED 91 to transmit a corresponding coded signal through window 93 of back 77.

Transmitter 71 may be held and operated in substantially the same way as conventional wireless remote control transmitters, the principal difference between transmitter 71 and conventional transmitters being that, when the keys of transmitter 71 are being operated, back 77, as opposed to top end 79, is pointed in the direction of the appliance being controlled. Because it is believed that most users tend to hold an idle transmitter so that the bottom wall of the housing is already pointed in the direction of the appliance, it is believed that operation of transmitter 71 will be more comfortable and less awkward and the keys more easily identifiable than conventional transmitters.

Figure 9:
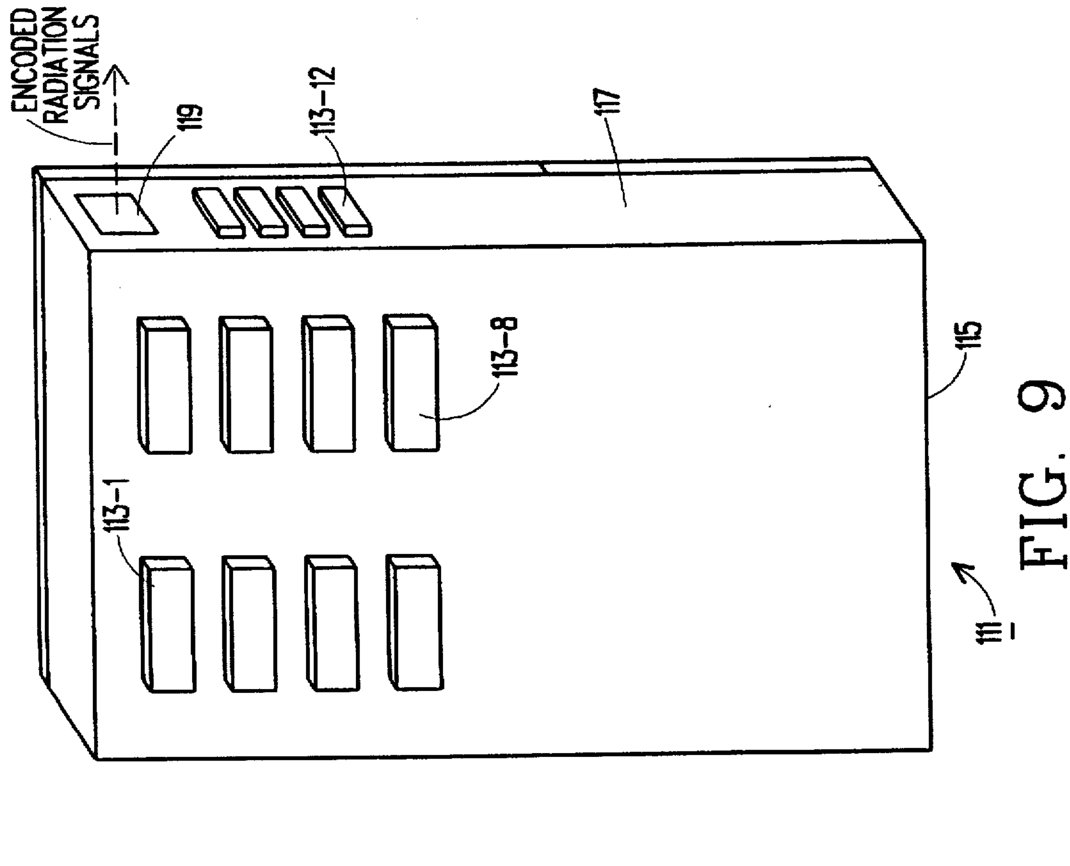
FIG. 9 is a perspective view taken from the front of another embodiment of the invention.

In FIG. 9 there is shown a perspective view of another embodiment 111 of a transmitter constructed according to this invention. In transmitter 111, the controls 113-1 through 113-12 are on the front 115 and the side 117 and the encoded signals all exit through a window 119 in an opening in side 117.

Figure 10:
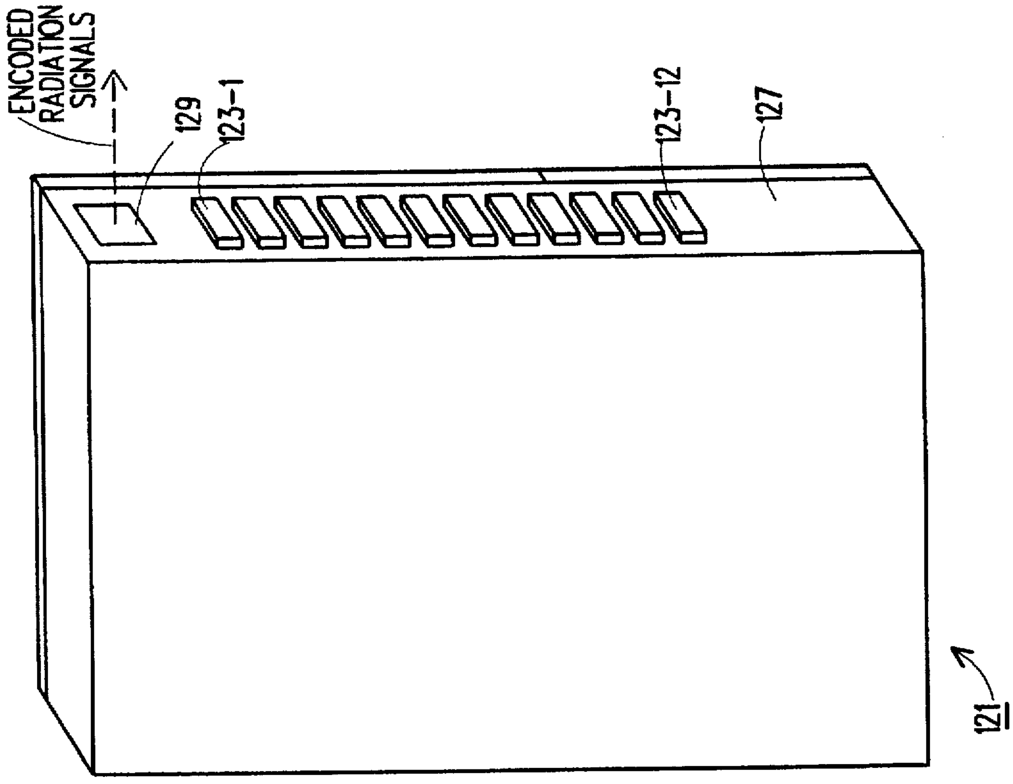
FIG. 10 is a perspective view taken from the front of another embodiment of the invention.

In FIG. 10 there is shown a perspective view of another embodiment 121 of this invention. In transmitter 121, the controls 123-1 through 123-12 are all on the side 127 and the encoded signals all exit through a window 129 in an opening in the side 127.

Figure 11:
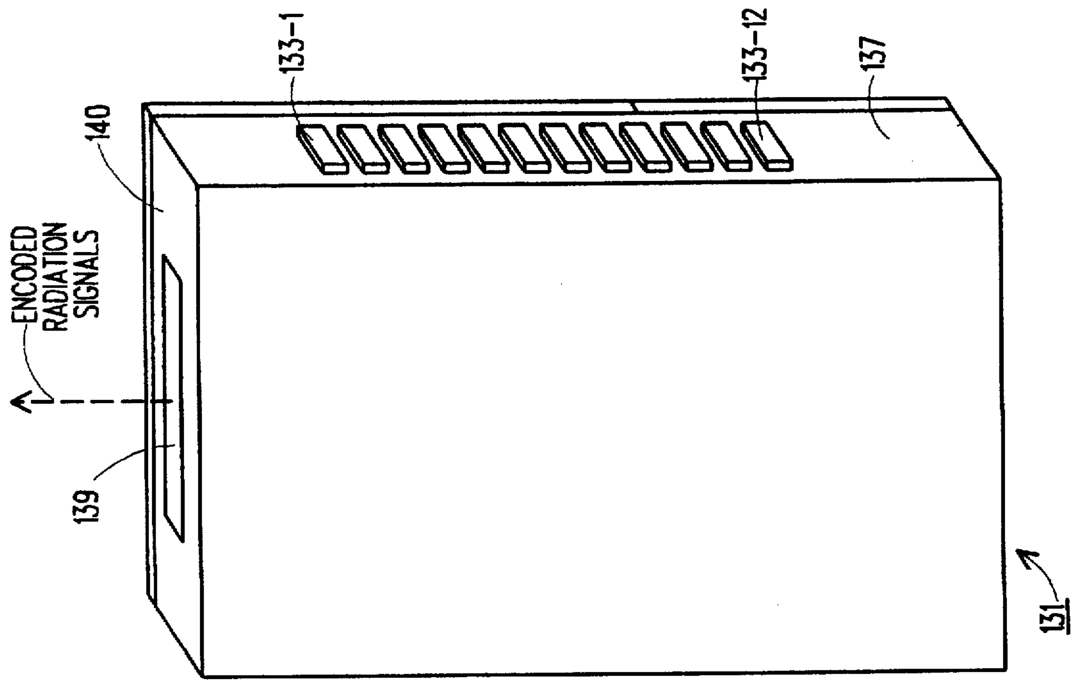
FIG. 11 is a perspective view taken from the front of another embodiment of the invention.

In FIG. 11 there is shown a perspective view of another embodiment 131 of this invention. In transmitter 131, the controls 133-1 through 133-12 are all on the side 137 and the encoded signals all exit through a window 139 in the top 140.

Figure 12:
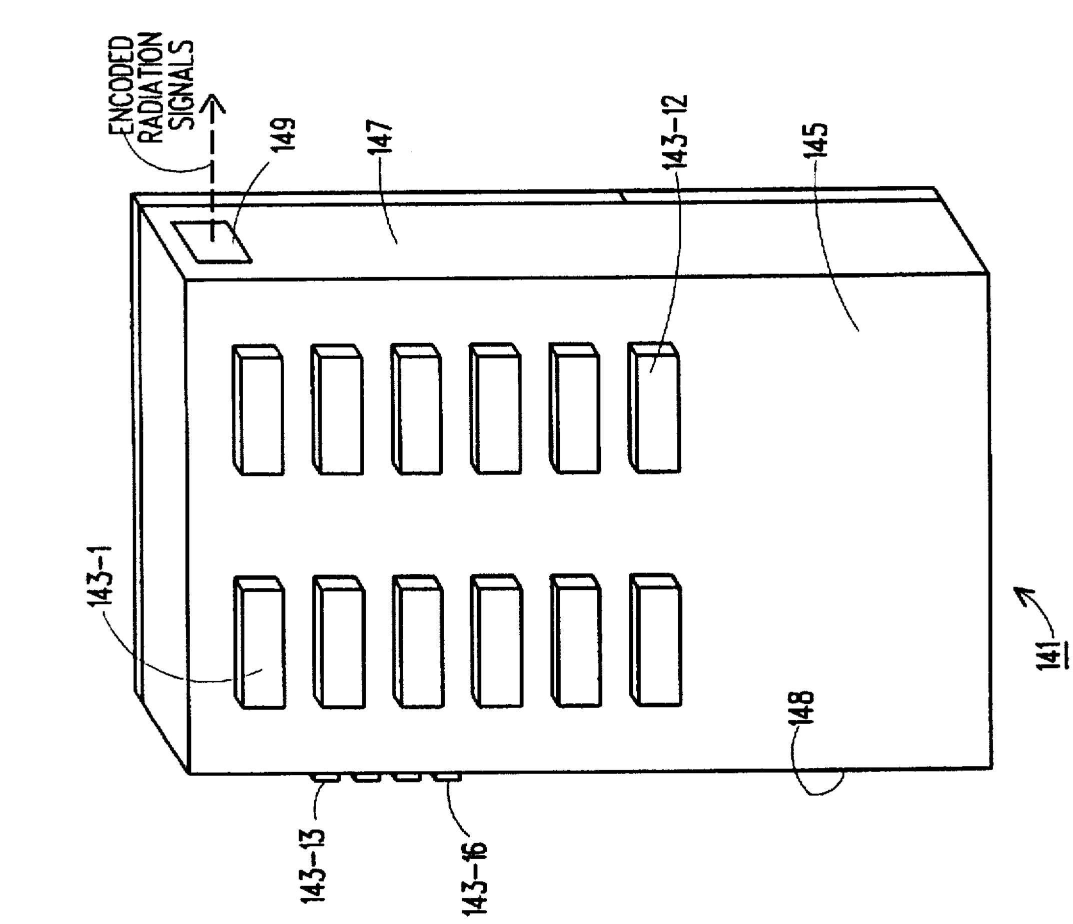
FIG. 12 is a perspective view taken from the front of another embodiment of the invention.

In FIG. 12 there is shown a perspective view of another embodiment 141 of this invention. In transmitter 141 the controls 143-1 through 143-16 are on the front 145 and the side 148 and the encoded signals all exit through a window 149 in the side 147.

Figure 13:
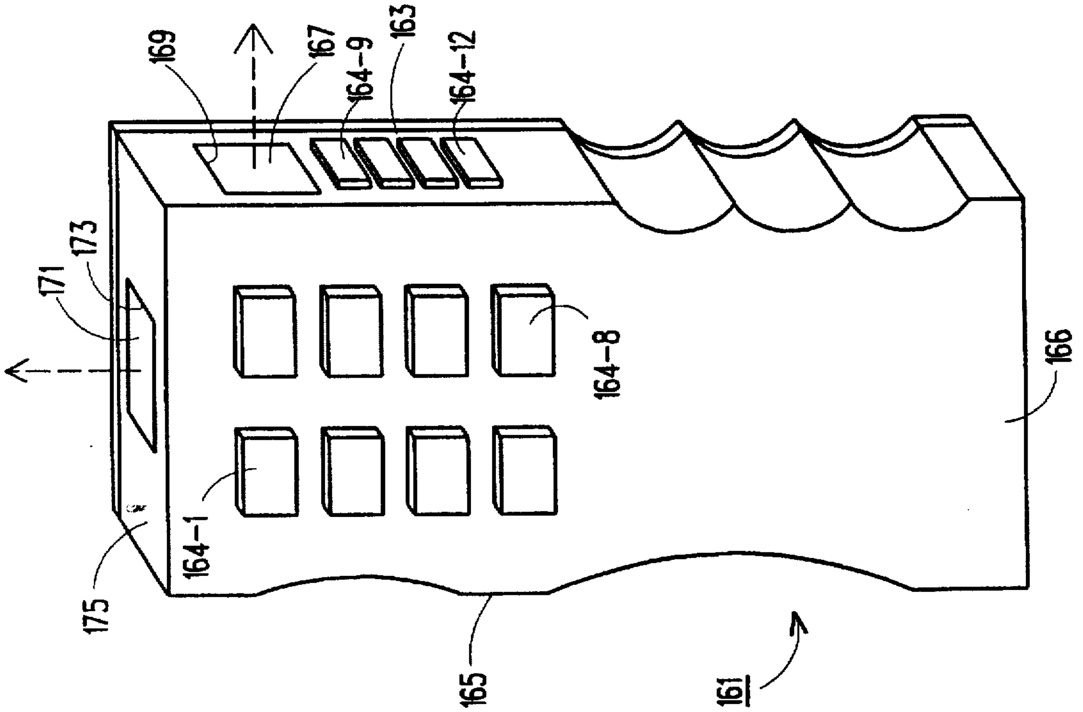
FIG. 13 is a perspective view taken from the front of another embodiment of the invention.

In FIG. 13, there is shown a perspective view of another embodiment 161 of this invention. In transmitter 161, right side 163 is specifically contoured to conform to the shape of the lower three fingers of a hand while left side 165 is shaped to conform to the thumb and thenar eminence of the hand. Controls 164-1 and 164-8 are on the front 166 and controls 164-9 through 164-12 are on side 163; and encoded signals exit through a window 167 in an opening 169 in right side 163 or through a window 171 in an opening 173 in top 175.

Figure 15:
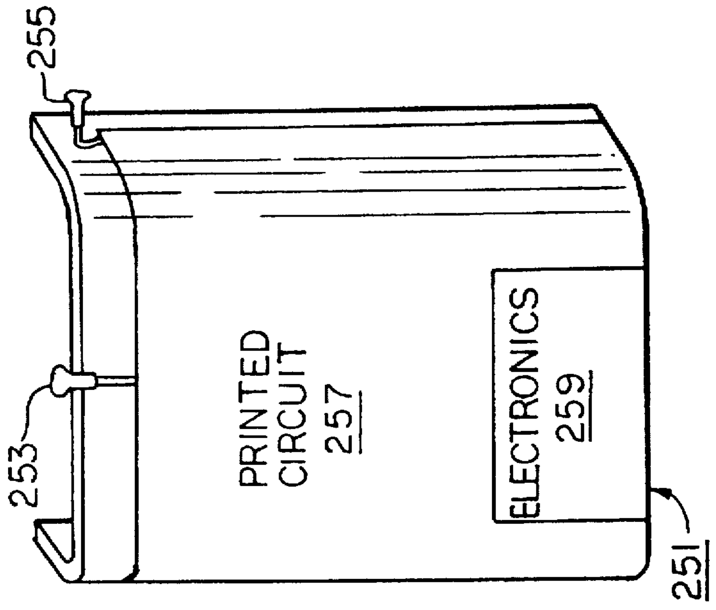
FIG. 15 is a perspective view of the printed circuit board in the embodiment of the invention shown in FIG. 14.
Figure 14:
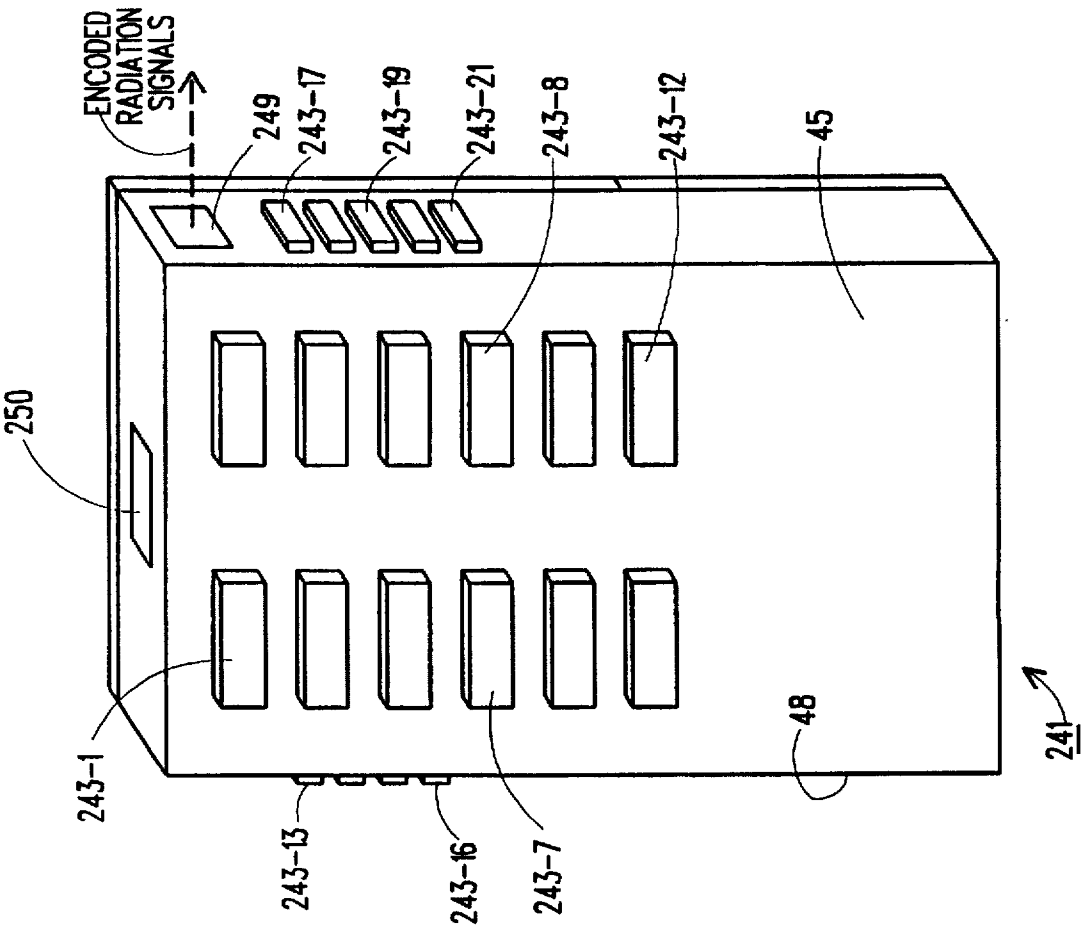
FIG. 14 is a perspective view taken from the front of another embodiment of the invention.

In FIG. 14 there is shown a perspective view of another embodiment 241 of this invention. In transmitter 241, the controls 243-1 through 243-21 are on the front 245, left side 247 and right side 248, the printed circuit board 251, see FIG 15, is U-shaped and includes two LED's 253 and 255 along with a printed circuit 257 and electronics 259 and the encoded signals exit through window 249 on the side and window 250 on the top.

The embodiments of the present invention recited herein are intended to be merely exemplary and those skilled in the art will be able to make numerous variations and modifications to it without departing from the spirit of the present invention. For example, instead of one L shaped flexible printed circuit board, there could be a pair of flat circuit boards, either electrically unconnected to each other or electrically connected by a suitable connector. All such variations and modifications are intend to be within the scope of the present invention as defined by the claims appended hereto.

What is claimed is:

1. A wireless remote control transmitter for remotely controlling the operation of consumer entertainment electronics appliance, said wireless remote control transmitter comprising:

a. a housing, said housing including a front,a top end, a bottom end and a first side, said front being wider than said first side, said first side including a window;

b. means disposed within said housing for outputting a control signal through said window on said first side recognizable by the consumer entertainment electronics appliance in response to a command received from a keyboard, and c. keyboard means for inputting commands to said outputting means, said keyboard means including a keyboard.

2. The wireless remote control transmitter as claimed in claim 1 wherein said outputting means comprises a printed circuit board having a printed circuit, electronics and a control signal emitter.

3. The wireless remote control transmitter of claim 2 wherein said control signal emitter is an LED.

4. The wireless remote control transmitter of claim 1, wherein said housing is generally rectangular.

5. The wireless remote control transmitter of claim 1, wherein said first side is shaped to conform to the at least some of the fingers of a user.

6. A wireless remote control transmitter for remotely controlling the operation of a consumer entertainment electronics appliance, said wireless remote control transmitter comprising:

a. a generally rectangular housing, said housing including a front, a back, a first side, a second side, a top end and a bottom end, said front being wider than said first side, one of said first and second sides including a window, b. an actuable electromagnetic radiation emitter disposed within said housing for emitting a control signal through said window recognizable by the consumer entertainment electronics appliance; and c. a manually operable control actuable from one of said first and second sides of said housing, said manually operable control being coupled to said actuable electromagnetic radiation emitter such that actuating said manually operable control causes said actuable electromagnetic radiation emitter to emit a control signal.

7. The wireless remote control transmitter of claim 6, wherein said first and second sides are shaped to conform to at least some of the fingers of a user.

8. A wireless remote control transmitter for remotely controlling the operation of a consumer entertainment electronics appliance, said wireless remote control transmitter comprising:

a. a housing, said housing including a top end, a bottom end, a front, a back, a first side and a second side;

b. a first keyboard mounted in said housing, said fit keyboard including a first manually depressible key extending through said first side of said housing;

c. a second keyboard mounted in said housing, said second keyboard including a second manually depressible key extending through said second side of said housing;

d. a first actuable electromagnetic radiation emitter disposed within said housing for emitting a control signal recognizable by the consumer entertainment electronics appliance through said top end of said housing;

e. a second actuable electromagnetic radiation emitter disposed within said housing for emitting a control signal recognizable by the consumer entertainment electronics appliance through said first side of said housing; and f. means for actuating said first and second actuable electromagnetic radiation emitting in response to depression of a manually depressible key on one of said first and second keyboards.

9. A wireless remote control transmitter for remotely controlling the operation of a consumer entertainment electronics appliance, said wireless remote control transmitter comprising:

a. a housing, said housing including a top end, a bottom end, a front, a back, a first side and a second side, said top end having a first window and said first side having a second window;

b. electromagnetic radiation emitter means disposed within said housing for emitting a control signal through said first and second windows in said housings, said control signal corresponding to a function of the consumer entertainment electronics appliance;

c. a first keyboard mounted in said housing, said first keyboard including a first plurality of manually depressible keys extending through said front of said housing, each of said first plurality of manually depressible keys being used to input a command relating to a function of the consumer entertainment electronics appliance;

d. a second keyboard mounted in said housing, said second keyboard including a second plurality of manually depressible keys extending through said first side of said housing each of said second plurality of manually depressible keys being used to input a command relating to a function of the consumer entertainment electronics appliance;

e. a third keyboard mounted in said housing and having a plurality of manually depressible keys extending through said second side of said housing each of said plurality of keys on said third keyboard being used to input a command relating to a function of the consumer entertainment electronics appliance; and f. means for causing said radiation emitter means to emit a control signal corresponding to the command inputted by depression of any one of said manually depressible keys.

10. A wireless remote control transmitter for remotely controlling the operation of consumer entertainment electronics appliance, said wireless remote control transmitter comprising:

a. a housing, said housing including a front, a first side and a second side, said front being wider than said first side and being wider than said second side, said first side including a window;

b. means disposed within said housing for outputting a control signal through said window recognizable by the consumer entertainment electronics appliance in response to command received from a keyboard, and c. keyboard means for inputting commands to said outputting means, said keyboard means including a keyboard having a key on said first side of said housing and a key on said second side of said housing.

* * * * *